United States Patent
Miller (10) Patent No.: US 6,190,092 B1
(45) Date of Patent: Feb. 20, 2001

(54) DENSITY-ENHANCED REMEDIATION OF DENSE NON-AQUEOUS PHASE LIQUID CONTAMINATION OF SUBSURFACE ENVIRONMENTS

(75) Inventor: Cass T. Miller, Chapel Hill, NC (US)

(73) Assignee: The University of North Carolina at Chapel Hill, Chapel Hill, NC (US)

(*) Notice: Under 35 U.S.C. 154(b), the term of this patent shall be extended for 0 days.

(21) Appl. No.: 09/198,988

(22) Filed: Nov. 23, 1998

(51) Int. Cl.⁷ .................................... B01D 12/00
(52) U.S. Cl. .................. 405/263; 405/128; 210/747; 166/245; 588/248; 588/261
(58) Field of Search .......................... 405/128, 258, 405/263; 588/261, 248; 210/634, 740, 747, 800; 166/245, 266, 268, 270.1

(56) References Cited

U.S. PATENT DOCUMENTS

| | | | |
|---|---|---|---|
| 3,981,361 | * 9/1976 | Healy | 166/270.1 X |
| 4,741,399 | * 5/1988 | Hurd et al. | 166/270.1 |
| 4,848,460 | * 7/1989 | Johnson, Jr. et al. | 166/245 |
| 5,316,085 | * 5/1994 | Dawson | 166/369 |
| 5,370,478 | * 12/1994 | Bartlett et al. | 405/128 |
| 5,449,251 | 9/1995 | Daily et al. | 405/128 |
| 5,615,974 | * 4/1997 | Land et al. | 405/128 |
| 5,733,067 | * 3/1998 | Hunt et al. | 405/128 |
| 5,753,122 | 5/1998 | Taylor et al. | 210/611 |
| 5,905,036 | * 5/1999 | Pope et al. | 435/262 |
| 5,993,660 | * 11/1999 | Shook et al. | 210/747 X |

\* cited by examiner

Primary Examiner—Eileen D. Lillis
Assistant Examiner—Tara L. Mayo
(74) Attorney, Agent, or Firm—Jenkins & Wilson, P.A.

(57) ABSTRACT

A method for remedying contamination of a subsurface environment by a non-aqueous phase liquid that is denser than water (DNAPL). The subsurface environment has a resident aqueous phase and a DNAPL phase. A dense aqueous solution that has a density greater than a density of the DNAPL phase is introduced to the subsurface environment. The dense aqueous solution displaces the resident aqueous phase and causes the DNAPL phase to rise above the greater density aqueous solution. The DNAPL phase is then recovered, which substantially remedies the contamination of the subsurface environment.

27 Claims, 2 Drawing Sheets

(2 of 2 Drawing Sheet(s) Filed in Color)

DENSITY-ENHANCED REMEDIATION OF DENSE NON-AQUEOUS PHASE LIQUID CONTAMINATION OF SUBSURFACE ENVIRONMENTS

GRANT STATEMENT

This invention was made in part from government support under Grant Number 5 P42 ES005948 from the National Institute of Environmental Health Sciences (NIEHS), a branch of the National Institutes of Health (NIH). The U.S. Government has certain rights in the invention.

TECHNICAL FIELD

The present invention relates generally to methods for remedying subsurface soil contamination. More particularly, the present invention relates to a method for remedying the contamination of a subsurface environment by dense non-aqueous phase liquids (DNAPLs).

The publications and other materials used herein to illuminate the background of the invention, and in particular cases, to provide additional details respecting the practice, are incorporated herein by reference, and for convenience, are referenced by author and date in the following text, and respectively grouped in the appended list of references.

| Table of Abbreviations | |
|---|---|
| CF | cosolvent flushing |
| DERD | density-enhanced remediation of DNAPLs |
| DNAPL | dense non-aqueous phase liquids |
| IBD | In situ biodegradation |
| IFT | interfacial tension |
| ISGS | in situ gas stripping |
| LNAPL | less dense non-aqueous phase liquids |
| NAPL | non-aqueous phase liquids |
| PAT | pump-and-treat |
| PCE | perchloroethylene |
| RW | reactive walls |
| SI | steam injection |
| SF | surfactant flushing |
| 1,1,1-TCA | 1,1,1-trichloroethane |
| 1,1,2-TCA | 1,1,2-trichloroethane |
| TCE | trichloroethylene |
| VE | vapor extraction |

BACKGROUND ART

Contamination of subsurface environments by fluids that are immiscible with water has occurred routinely in the United States and industrialized countries around the world over the last 40 years. Mercer and Cohen (1990). Such fluids are often termed non-aqueous phase liquids (NAPLs) in general, or LNAPLs when less dense or DNAPLs when more dense than the groundwater present in the subsurface. Typical LNAPLs are petroleum products (e.g., gasoline, diesel fuel, jet fuels, heating oils), and typical DNAPLs are chlorinated solvents (e.g., tricholoethylene, tetrachloroethylene, dichloroethanes). Schwille (1988); Bartow and Davenport (1990).

Species present in such NAPL phases can solubilize to the aqueous phase, volatilize to the gas phase, or sorb to the solid phase present in the subsurface. Environmental concerns result when such species are linked to human or ecological health concerns and become present in sufficient quantities in a mobile aqueous or gas phase. Such health concerns are associated with common constituents of NAPLs found routinely in the environment, such as trichloroethylene and benzene.

Once released into the subsurface, NAPLs migrate and typically reach a stable, immobile state within a relatively short time scale (hours to days) after the source is removed. Immobile NAPLs can remain in the subsurface over time scales that can range from months to decades or longer under natural conditions, because they are comprised of species that are only sparingly soluble in water. Miller, Poirier-McNeill et al. (1990). As a result, NAPLs are considered a long-term source of groundwater contamination. Mayer and Miller (1996).

DNAPLs tend to be an even more significant problem than LNAPLs because of the following characteristics:

(1) they were routinely used in industrial practices, spilled, and intentionally disposed of in the subsurface in the United States, starting in the 1960's and continuing for two decades;

(2) they often migrate larger distances than LNAPLs;

(3) they often penetrate the water table;

(4) they can form pools contained by low-permeability materials;

(5) they are often comprised of species that tend to degrade slowly in many systems;

(6) they are extremely difficult to locate and remove; and (7) they contain species that are typically regulated at low concentrations in drinking water (e.g., 5 µg/L).

Because of the above characteristics, remediation of subsurface contamination resulting from DNAPLs is a frequently encountered problem, which has proven to be extremely difficult. Methods that have been used to remove such contamination include: pump-and-treat, cosolvent flushing, surfactant flushing, steam injection, and in situ biodegradation. To varying extents, all of these strategies have been implemented at the laboratory and pilot or full field scale. Each of these methods results in the removal of some solute mass from a system contaminated with a DNAPL, but the rate at which the removal occurs and the expense involved with this standard set of methods leaves the problem of DNAPL remediation unsolved. The advantages and disadvantages of the common set of DNAPL removal and containment strategies are described in detail as follows.

Pump-and-Treat

Pump-and-treat (PAT) is perhaps the most common method of subsurface restoration. The method consists of installing a well in a region contaminated by a DNAPL and pumping it, which results in the induction of a flow of groundwater in all directions toward the extraction well for some local volume in the vicinity of the well called the capture zone. de Marsily (1986); Domenico and Schwartz (1990). As the groundwater passes through a capture zone that is contaminated with DNAPL, a portion of the DNAPL will dissolve into the groundwater and be transported with it. If a PAT scheme is continued for a sufficient period of time, all of the DNAPL present in the capture zone will be solubilized and exit the system through the pumping well. Mayer and Miller (1996). In theory, placement of a sufficient number of adequately designed pumping wells and appropriate operation for a sufficient period of time will result in the removal of all DNAPL contaminants from a contaminated system.

Once these contaminants are brought to the surface from the wells, treatment of the contaminated waste stream is accomplished and the water is either injected back into the subsurface or disposed of using other means. The actual treatment processes used depends upon the characteristics of the waste stream, treatment objectives, discharge stream quality constraints, and other factors.

The PAT method is appealing because of its simplicity. However, experience has shown that this approach is not very efficient, where efficiency is defined as the mass of DNAPL removal per volume of fluids removed. Mackay and Cherry (1989). This lack of efficiency results from the upper bound on the mass removal rate that results from the solubility of the DNAPL in the water phase, and because the water removed from the pumping wells may be far removed from the solubility limit of the DNAPL in the fluid phase. The solubility of the DNAPL forms the upper bound on the mass removal rate because capillary forces that trap a DNAPL are typically not overcome by the viscous forces induced by pumping; thus, mobilization of free-phase DNAPL typically does not occur in PAT operations. Further, if mobilization does occur, viscous forces must be greater than the sum of both capillary and gravity forces if free phase capture by a pumping well is to occur. Because efficiency is low for PAT methods and cleanup standards for DNAPLs are often stringent, PAT remediation is ineffective as a means of remediating DNAPL-contaminated groundwater over time scales of even years. For this reason, PAT methods have been classified in some instances as a contaminant containment strategy, rather than as a restoration method.

PAT methods are inefficient not only because they do not mobilize the DNAPL into a capture well, but also because DNAPL distribution patterns in typical heterogeneous subsurface systems results in the formation of regions of high saturations of DNAPLs called pools. These pools in turn block the pore space of porous media, deflecting groundwater flow around the DNAPL zone. Since contaminant removal occurs only through mass transfer from the DNAPL to the aqueous phase, the surface area that exists between the groundwater and DNAFL, which is relatively small, results in a significant mass transfer limitation for most systems, which is manifest as concentrations of dissolved contaminants that are far removed from equilibrium values.

Vapor Extraction

Vapor extraction (VE) is a frequently used method of remediation in which a well (or wells) are installed into the unsaturated zone and a vacuum is applied to the well(s). Walter (1994); U.S. Army Corps of Engineers (1995). Much like PAT, a pressure gradient is established in a local area around the well, which results in gas-phase flow toward the well. If the contaminant of interest is present in the gas phase, then removal of the contaminant occurs as the gas, phase is removed from the system. Because much less energy is required to extract a volume of gas from the subsurface compared to an equivalent volume of water, VE has the potential to be more efficient than PAT methods. Ross and Lu (1994); Travis and Macinnis (1992).

In order to realize the potential efficiency of VE methods, a contaminant must be present in the gas phase. If the contaminant originally enters the subsurface as a NAPL, then volatilization to the gas phase must occur for all species of interest, thus VE is only a potentially viable technology for relatively volatile species. She, Sleep et al. (1995). In addition, volatilization must occur at a sufficiently rapid rate such that the gas-phase concentrations are sustained at a relatively high level compared to their vapor pressure. If this does not occur, then mass removal rates are said to be mass transfer limited. VE systems are often mass transfer limited, removing contaminants with a concentration that is much less than the vapor pressure of the target species.

A more important problem with VE exists for DNAPL contamination that exists in the saturated zone: a contaminant must undergo a series of mass transfer steps, first from the DNAPL phase to the water phase and second from the water phase to the gas phase. For contaminants to be removed from the system, they must volatilize from the top of the water table into the gas phase and be removed in the VE system. The dissolution of the DNAPL into the aqueous phase and transport to interface of the unsaturated zone requires a series of physical and chemical transport steps that in sum are usually much slower that volatilization of NAPL in the unsaturated zone alone. Additionally VE does not aggressively control the movement of a DNAPL in the saturated zone, where the majority of such contaminants are likely to reside. For this reason, PAT and VE are often used together—a procedure that typically increases the rate at which contaminants are removed from the subsurface compared to the use of either method alone. However, this overall rate of removal is still sufficiently slow as a result of mass transfer limitations that VE is not an efficient means of DNAPL remediation for most sites. Mccann, Boersma et al. (1994); Larkin and Hemingway (1991).

An effort to reduce the mass transfer and transport limitations of VE has resulted in a related process known as in situ gas stripping (ISGS). ISGS is similar to VE except that a gas phase is injected into the saturated zone. Marley (1991). As the gas phase is transported vertically under gravity forces through the saturated zone and exits into the unsaturated zone, the hope is that an increased rate of DNAPL removal from the saturated zone results compared to VE. While ISGS can often be more effective than VE or VE and PAT at removing DNAPL contaminants from the saturated zone, an injected gas phase often follows preferential pathways under gravity-dominated forces and directly influences a volume within a relatively small distance of the gas-phase injection well.

In Situ Biodegradation

In situ biodegradation (IBD) is a process that encourages the establishment and growth of microorganisms that will transform contaminants originally present in a DNAPL into products that pose less of risk than the original contaminant. The reactants and products, microorganisms required, and relative rates at which such transformations occur depend upon the contaminant of concern, the electron acceptor conditions, and a variety of other conditions. Domenico and Schwartz (1990), Dupont (1993). Determining specific pathways, rates, and conditions that encourage such transformations for a wide variety of contaminants is an active area of research.

In cases in which contaminants are transformed quickly into inoculous products, IBD can be an attractive process. However, many DNAPLs are comprised of species for which rates of transformation have been found to be relatively slow, especially for native microbial populations and redox conditions. For example, contaminants such as trichloroethylene (TCE) and perchloroethylene (PCE) have proven relatively resistant to rapid microbial transformations. Tsien, Brusseau et al. 1989; Semprini, Roberts et al. (1990). An additional, but familiar, limitation occurs with IBD processes: mass transfer and transport limitations. In order for transformations to occur, the contaminant must be dissolved into the aqueous phase and come into contact with an effective microbial population in the presence of needed nutrients and appropriate electron acceptors. Zacharias, Lang et al. (1995). For these reasons, IBD has not, in general, proven to be an effective means of remediating DNAPL-contaminated subsurface systems.

Cosolvent Flushing

Cosolvent flushing (CF) is one of a group of remediation methods that are often collectively termed enhanced remediation methods, which together form a set of approaches that are more aggressive and typically more effective than the conventional methods described above. The fundamental notion involved with enhanced remediation methods is to take aggressive actions that markedly affect the mass removal rates of NAPL-contaminated regions, either through increasing rates of mass transfer, Brandes and Farley (1993), or through mobilization, Larson, Davis et al. 1982, Roeder, Brame et al. (1996), of previously trapped NAPL residual contaminants.

CF is implemented by flushing a contaminated region with a mixture of water and alcohol(s). Vancho (1994); Imhoff, Gleyzer et al. (1995b). The flushing solution is designed such that the NAPL contaminant is much more soluble in the cosolvent solution than it is in an aqueous solution alone, increasing the potential rate of removal. If present as a sufficient fraction of the flushing phase, cosolvent systems can completely solubilize a quantity of NAPL that they come in contact with—reducing a two-fluid-phase immiscible contamination problem to a single-fluid-phase miscible displacement problem. Such methods have worked relatively well in laboratory experiments, and these methods have been tried in the field as well. Rao, Annable et al. (1997).

Two potentially significant drawbacks exist for CF approaches: cost and the heterogeneous distribution of NAPL in the subsurface. Alcohols are expensive in the quantities typically needed for in situ remediation of DNAPL contamination. This cost and the need to use relatively high fractions of alcohol for many DNAPL-alcohol combinations of potential use presents a considerable economical challenge, which for most cases will result in the need to recapture and reuse the alcohol solutions. This recapturing process will require the use of some sort of separation facility to separate contaminants, water, and alcohols into their component parts. The large volumes of alcohols needed and the complexity and expense of their recovery poses significant limitations to the widespread use of CF.

In addition, as previously described, DNAPL contamination of subsurface systems often results in complex patterns of DNAPL distributions, including pooling of DNAPLs on low permeability materials. These pools attain length scales and distributions that result in accumulation in coarse-grained materials and pore openings that impede the flow of water, or a cosolvent mixture, through the DNAPL contaminated region. Under such circumstances, the flushing solution will largely bypass the DNAPL-contaminated zone and mass removal will occur through dissolution along the edges of the DNAPL pool. This is another sort of mass transfer limitation which can significantly increase the number of pore volumes of flushing needed to clean up a contaminated region compared to the case with an equivalent volume of DNAPL that is uniformly distributed throughout a region. As the number of pore volumes of flushing needed to meet a remediation target increases, the time and expense involved with CF remediation increases as well. The economics of CF are an important limitation and constraint involved with the method.

Surfactant Flushing

Surfactant flushing (SF) is another method in the class of enhanced remediation methods, which is similar in many respects to CF, including similar advantages and limitations. Similar to cosolvents, surfactants can significantly increase the solubility of a DNAPL in an aqueous solution and, under certain conditions, can result in the formation of a single, stable fluid phase that contains a mixture of water, surfactant, and DNAPL. Sharma and Shah (1989); Pope and Wade (1995); Shiau, Sabatini et al. (1996). Surfactants can significantly reduce the interfacial tension (IFT) that exists between a DNAPL and an aqueous phase, often by orders of magnitude under appropriate conditions. Reductions in IFT reduce capillary forces and encourage the mobilization of DNAPLs that were previously held immobile in a state of residual saturation. Pennell, Pope et al. (1996). When such mobilization occurs, rapid and efficient removal of DNAPLs can result—often removing the majority of DNAPL residual within a few volumes under controlled laboratory conditions. Willson, Hall et al. (1998).

While surfactant methods show promise, Okuda, Mcbride et al. (1996), a number of important challenges arise, which have not been routinely overcome as yet. Pennell, Abriola et al. (1996). First, surfactants are expensive, so it is important to have a process that is efficient in terms of the number of pore volumes that must be flushed. It is also usually necessary for economic reasons to implement a separations strategy to capture and reuse the surfactant solution, which adds complexity and expense to the use of the process. Lipe, Sabatini et al. (1996). Second, reductions in IFT can mobilize a DNAPL, but if the viscous forces are not sufficient to overcome gravity forces, the DNAPL may be transported vertically, potentially spreading the contamination to previously uncontaminated portions of a subsurface system. Longino and Kueper (1995); Mason and Kueper (1996). Third, phase behavior for surfactant solutions is affected by a variety of chemical properties, including surfactant fraction in solution, pH, and ionic strength, and controlling the set of these factors to affect the desired behavior in the subsurface can be a challenge. Fourth, heterogeneous distributions of DNAPLs, especially pools, can lead to flow bypassing and mass transfer limitations that can greatly increase the number of pore volumes of a flushing solution needed to reach a given DNAPL removal fraction.

Steam Injection

Steam injection (SI) is an enhanced remediation process that relies upon the injection of steam into the subsurface to convert the DNAPL present to a gas phase, which may be easily removed from the system. Forsyth (1994).

This process can be effective at removing entrapped DNAPL, but several challenges remain. Sittler, Swinford et al. (1992). The process is typically implemented such that the steam must contact DNAPL, which suggest that water and DNAPL in the system are volatilized. As a minimum, the system temperature must be brought to and maintained at the boiling point of the DNAPL until the DNAPL gas has been removed from the system. Since subsurface systems tend toward thermodynamic equilibrium, this implies that the water and solid materials present are also heated to a similar minimum level—either the boiling point of DNAPL or water. The energy required to accomplish this can be substantial, especially for cases in which the DNAPL has penetrated deeply into the saturated zone. A further complication is that when the DNAPL is heated a variety of physiochemical properties are altered, including surface tension, density, viscosity, and diffusion coefficients. For regions of large DNAPL saturation, such changes ahead of a steam front can mobilize a DNAPL by changing the balance of forces and allow the DNAPL to penetrate deeper regions of an aquifer.

REACTIVE WALLS

Reactive walls (RW) are a technology that has evolved rapidly over the last few years. This technology is implemented by placing a barrier in the subsurface that directs the groundwater flow through specific regions in the construct. These regions are comprised of an appropriate material that facilitates the transformation of contaminants that are present in the groundwater phase. Groundwater then exits the wall free of the target contaminant and not a threat to potential down-gradient users of the resource. Kaplan, Cantrell et al. (1996). The material that such walls are constructed from varies depending upon the application. Zero-valent iron is a popular choice for sites that are contaminated with DNAPLS such as TCE and PCE. In some cases, RW are used in a region to establish and promote biological growth and transformation of the target contaminants of interest.

There are some drawbacks to RW, the most obvious being that the DNAPL contaminated region is not affected by the method, only the contaminant in the dissolved phase. Because such walls are constructed typically under natural gradient conditions, their period of operation will be affected by the same set of mass transfer limitations as the PAT method, but over a longer period of time since DNAPL removal rates will be mass transfer and transport limited. Thus, RW for DNAPL contamination must be operative over periods of time similar to or longer than PAT methods, which can range to times over a century. In addition, RW can be expensive to construct and difficult to maintain, especially when the potentially large depths of DNAPL penetration are encountered and the long periods of maintenance needed are considered.

Because each of these approaches has significant limitations, recent efforts have centered on containment or treatment of the groundwater that is contaminated by the DNAPL. However, such efforts are deemed unsatisfactory in that they treat a symptom of the subsurface contamination problem, as opposed to the problem itself.

What is needed is a method to effectively, quickly, and economically remediate subsurface systems that are contaminated with DNAPLs. Such a method is currently unavailable in the art.

Disclosure of the Invention

Disclosed herein is a method for remedying contamination of a subsurface environment by a non-aqueous phase liquid that is denser than water (DNAPL). The subsurface environment comprises a resident aqueous phase and a DNAPL phase, and the method includes the steps of introducing to the subsurface environment a dense aqueous solution that has a density greater than the density of the DNAPL phase present in the subsurface environment; displacing the resident aqueous phase with the dense aqueous solution, thereby causing the DNAPL phase to rise above the greater density aqueous solution; and recovering the DNAPL phase and thereby substantially remedying contamination of the subsurface environment.

Accordingly, it is an object of the present invention to provide a method for remedying contamination of a subsurface environment by a DNAPL which provides for effective and economical cleanup of a contamination site.

It is another object of the present invention to provide a method for remedying contamination of a subsurface environment by a DNAPL which does not promote downward migration of DNAPLs.

It is, yet another object of the present invention to provide a method for remedying contamination of a subsurface environment by a DNAPL which works in presence of DNAPL pools.

It is a further object of the present invention to provide a method for remedying contamination of a subsurface environment by a DNAPL which provides for rapid cleanup times.

It is, still a further object of the present invention to provide a method for remedying contamination of a subsurface environment by a DNAPL which utilizes a nontoxic and inexpensive flushing solution.

Some of the objects of the invention having been stated hereinabove, other objects will become evident as the description proceeds, when taken in connection with the accompanying drawings as best described hereinbelow. "The file of this patent contains at least one photograph executed in color. Copies of this patent with color photograph(s) will be provided by the U.S. Patent and Trademark Office upon request and payment of necessary fee."

BRIEF DESCRIPTION OF THE DRAWINGS

The file of this patent contains at least one photograph executed in color. Copies of this patent with color photograph(s) will be provided by the U.S. Patent and Trademark Office upon request and payment of necessary fee.

BEST MODE FOR CARRYING OUT THE INVENTION

Contamination of subsurface environments by non-aqueous phase liquids that are denser than water (DNAPLs), such as chlorinated solvents, is an important environmental problem. Efforts to date to remediate such contamination have been only partially successful, because of the physics that controls the movement and trapping of such contaminants below the water table. In accordance with the present invention a novel approach for remediation of such systems that relies upon reversal of the density gradient between the aqueous phase and the DNAPL is provided. This is accomplished by increasing the density of the aqueous phase by introducing a dense aqueous solution, such as a salt solution, to the subsurface environment and displacing the resident aqueous-phase solution within the subsurface environment with the dense aqueous solution. This density gradient reversal effectively floats the DNAPLs to the top of the water table, where they can be easily recovered.

To overcome trapping in fine-grained materials, surfactant solutions can be added. Optionally, the surfactant solution can be introduced to the subsurface environment as a first or initial step of the method of the present invention. Alternatively, the surfactant solution can be introduced to the subsurface environment after the introduction of a first volume of the dense aqueous solution in accordance with the method of the present invention. After density-enhanced displacement, the remaining small amount of DNAPL present can be readily removed using conventional enhanced-remediation methods, such as cosolvent or surfactant flushing, with a relatively small volume of flushing solution. Density-enhanced remediation of DNAPLs approach is shown herein to be an effective and efficient approach for restoration of contaminated subsurface environments.

The method of the present invention particularly addresses the problems observed in prior art methods with respect to NAPL entrapment. To elaborate on these problems, NAPL entrapment results in a static distribution of an organic liquid in the subsurface. The static state results from the release of DNAPLs into typical subsurface environments. Once present in the subsurface, NAPLs follow complex patterns of flow, which are influenced by the porous medium and fluid properties manifest as gravity, viscous, and capillary forces. Since LNAPLs are less dense than water, they reside in the unsaturated zone and generally above the water table. DNAPLs tend to move vertically under gravitational forces and, if present in sufficient quantities to exceed the capillary entry pressure of the saturated zone, they will penetrate the water table. Schwille (1988).

Continuing with the problems associated with NAPL entrapment, capillary forces trap some fraction of a NAPL in the pore space, leaving behind a residual saturation present as a phase that may be continuous only over a single pore space or small set of connected pores. The distribution of residual NAPL is influenced by the morphology of the pore space, the wettability of the solid phase with respect to the fluids occupying the pore space, the density and interfacial tension of the NAPL phase, the velocity of the aqueous phase, and the boundary conditions associated with the aqueous phase and NAPL release. Pennell, Pope et al. (1996).

The distribution of DNAPL in the subsurface plays a crucial role in determining the difficulty associated with removing it from the subsurface. NAPLs present in the unsaturated zone above the water table are often the intermediate wetting phase, with the gas phase occupying the larger pore sizes and water occupying the smallest pore sizes. Below the saturated zone interface, DNAPLs are usually assumed to be the non-wetting phase and tend to occupy the largest pore spaces.

Consider a two-fluid-phase system consisting of an aqueous phase and a DNAPL phase that is non-wetting (i.e. non-aqueous), and a solid phase. In a homogeneous porous media, the pore size distribution is uniform in space. Since DNAPL residual saturation is often expressed as a function of funicular DNAPL saturation, homogeneous regions exposed to similar maximum concentrations of funicular DNAPL saturation would be expected to have similar levels of residual DNAPL saturation. However, natural systems are heterogeneous by nature, many markedly so. In heterogeneous systems, the largest pore sizes are distributed non-uniformly in the subsurface, which in turn leads to a non-uniform distribution of DNAPL residual. In heterogeneous finite entry pressure media, stable DNAPL pools of relatively high saturation can form in coarse-grained regions of the system. These pools have length scales that are consistent with the length scales of the porous media, which may be from centimeters to meters. Pools also form in depressions in hydraulic barriers, such as clay layers, that form the bottom boundary of a permeable hydraulic unit. Michalski, Metlitz et al. (1995). Because pools can have high DNAPL saturations, pooled regions are typically relatively impermeable to the flow of the wetting phase, which leads to mass transfer limitations for any method requiring phase change. Because of this, NAPL pools are the dominant feature limiting restoration of a DNAPL contaminated porous media. Whelan, Voudrias et al. (1994); Pearce, Voudrias et al. (1994).

As detailed above, efforts to remediate DNAPL contaminated subsurface systems have generally failed for a number of reasons:

(1) DNAPLs tend to move below the saturated zone and are difficult to locate;

(2) DNAPLs form pools that can lead to mass transfer limitations and downward mobilization;

(3) existing methods require many pore volumes of flushing, with the actual number increasing as a function of the heterogeneity of the system increases; and (4) existing enhanced methods of subsurface remediation are expensive.

To overcome these limitations with existing methods, in accordance with the present invention a novel method of DNAPL remediation of saturated porous media is provided: density-enhanced remediation of DNAPLs (DERD). The basic notion behind DERD is straightforward: the wetting phase density is modified so that trapped DNAPLs become significantly less dense than the aqueous phase. This leads to gravity forces acting upward on the DNAPL phase and motivates the upward migration of DNAPL toward the water table. If the wetting (i.e. aqueous) characteristics of the aqueous phase are not modified, the tendency will be for the DNAPL to migrate through the larger pore openings, precisely the class of pore sizes favored during the downward migration phase that contaminated the media.

Because DERD is a mobilization approach, mass transfer limitations are avoided. Also, unlike other enhanced remediation methods, mobilization caused by DERD must be in an upward direction—avoiding the potential problem of contaminating deeper, previously uncontaminated portions of an aquifer during a restoration effort.

The density modifications of the aqueous phase that are needed can be easily and economically accomplished using a variety of means, such as the addition of salt or sugar solutions in either single or multi-component form to a create a dense aqueous solution. Other mixtures that form wetting phases that are denser than the target DNAPLs are possible as well, but the exact choice of the solution is secondary and the optimal choice will depend upon local geochemistry conditions, the DNAPL of concern, and economic considerations related to the cost of the compounds added to the wetting phase. As an example of densities that are readily achievable, Table 1 lists the properties of some simple, common, single-component salt solutions. These properties can be compared to properties of some common DNAPLs that are listed in Table 2. This shows that a wide variety of choices exist to achieve densities of an aqueous solution that are significantly greater than typical DNAPLs and which will accomplish the objective of DERD.

TABLE 1

Densities of Single-Component Salt Solutions

| Name | formula | temp. (deg. C.) | g/100 g sat. soln. | density g/cm$^3$ |
|---|---|---|---|---|
| ammonium iodide | NH$_4$I | 25 | 64.5 | 1.646 |
| ammonium nitrate | NH$_4$NO$_3$ | 25 | 68.3 | 1.320 |

TABLE 1-continued

Densities of Single-Component Salt Solutions

| Name | formula | temp. (deg. C.) | g/100 g sat. soln. | density g/cm$^3$ |
|---|---|---|---|---|
| barium iodide | BaI$_2$—7.5H$_2$O | 25 | 68.8 | 2.277 |
| barium bromide | BaBr$_2$ | 20 | 51.0 | 1.710 |
| barium chlorate | Ba(ClO$_3$)$_2$ | 25 | 28.5 | 1.294 |
| barium chloride | BaCl$_2$ | 20 | 26.3 | 1.27 |
| barium perchlorate | Ba(ClO$_4$)$_2$ | 25 | 75.3 | 1.936 |
| calcium bromide | CaBr$_2$ | 20 | 58.8 | 1.82 |
| calcium chloride | CaCl$_2$—6H$_2$O | 25 | 46.1 | 1.47 |
| calcium iodide | CaI$_2$ | 20 | 67.6 | 2.125 |
| lithium bromate | LiBrO$_3$ | 18 | 60.4 | 1.830 |
| magnesium bromide | MgBr$_2$—6H$_2$O | 18 | 50.1 | 1.655 |
| magnesium iodide | MgI$_2$—8H$_2$O | 18 | 59.7 | 1.909 |
| potassium chloride | KCl | 25 | 26.5 | 1.178 |
| potassium citrate | KC$_6$H$_5$O$_7$ | 25 | 60.9 | 1.514 |
| potassium iodide | KI | 25 | 59.8 | 1.721 |
| potassium formate | KCHO$_2$ | 18 | 76.8 | 1.571 |
| sodium bisulfate | NaHSO$_4$—H$_2$O | 25 | 59.0 | 1.47 |
| sodium bromide | NaBr—2H$_2$O | 25 | 48.6 | 1.542 |
| sodium chlorate | NaClO$_3$ | 25 | 51.7 | 1.440 |
| sodium chloride | NaCl | 25 | 26.5 | 1.198 |
| sodium hydroxide | NaOH | 25 | 50.4 | 1.51 |
| sodium iodide | NaI | 25 | 64.8 | 1.919 |
| sodium perchlorate | NaClO$_4$ | 25 | 67.8 | 1.683 |
| sodium tungstate | NaWO$_4$—10H$_2$O | 18 | 42.0 | 1.573 |
| sucrose | C$_{12}$H$_{22}$O$_{11}$ | 25 | 67.89 | 1.340 |

TABLE 2

Densities of Common DNAPLS

| DNAPL | Density |
|---|---|
| carbon tetrachloride | 1.59 |
| o-dichlorobenzene | 1.31 |
| m-dichlorobenzene | 1.29 |
| 1,1-dichloroethane | 1.17 |
| 1,2-dichloroethane | 1.26 |
| 1,1,1-trichloroethane (1,1,1-TCA) | 1.35 |
| 1,1,2-trichloroethane (1,1,2-TCA) | 1.44 |
| 1,1-dichloroethylene | 1.22 |
| trichloroethylene (TCE) | 1.46 |
| tetrachloroethylene (PCE) | 1.63 |

STANDARD APPLICATION

As an example, DERD can be implemented in the following fashion:

(1) locate the approximate region of the DNAPL contamination;

(2) bound the region with wells that will be used for injection of a dense wetting-phase solution;

(3) install a shallow pumping well in the center of the region which penetrates the upper portion of the saturated zone;

(4) begin pumping a rate sufficient to induce a gradient that captures the flow from the target region—running the effluent through a suitable treatment system;

(5) inject a dense wetting-phase solution at the set of bounding wells at a depth that bounds the vertical extent of the contamination, which will result in the displacement of the native water with the injected solution;

(6) maintain the pumping and injection pattern until free-phase DNAPL is no longer collected from the pumping well;

(7) discontinue injection of the dense wetting-phase solution and maintain pumping to capture the residual injected solution and remove it from the subsurface; and (8) remove the remaining residual DNAPL by conventional methods, such as flushing through the installed wells with a surfactant or cosolvent solution.

It is important to note that many modifications of this scheme are possible within the general concept of density-enhanced displacement. Aspects that might vary include: the method and pattern used to deliver the dense wetting-phase solution, the method and pattern used to withdraw the flushing and resident fluids (e.g., horizontal or vertical wells, drains), the rates of injection and withdrawal, the precise properties of the injected fluid, and the choice and implementation of schemes to remove the remaining residual left behind after the gravity enhanced displacement process phase. It is also envisioned that vapor extraction might be useful during a DERD process for some applications.

Thus, in application, it is contemplated that the DERD method of the present invention can assume a large number of forms, with subsurface conditions and other factors affecting sound engineering design at any given location. This is the usual case for any remediation method applied in the field. Exemplary techniques for applying remediation techniques in the field can be found in U.S. Pat. Nos. 5,753,122 (IBD process) and 5,449,251 (SI process), the entire disclosure of which are herein incorporated by reference.

HETEROGENEOUS CONDITIONS

When subsurface conditions are moderately to highly heterogeneous, modifications to the basic DERD scheme outlined above may prove useful. Under such conditions, trapping of DNAPL can occur by contact with relatively fine-grained, and small pore size, materials overlying a region of entrapped DNAPL. That is, as the dense wetting-phase solution contacts the trapped and pooled DNAPL, gravity forces will act to cause it to move upward. However, if these forces are insufficient to move the DNAPL through a fine-grain region, because of capillary considerations, the DNAPL can remain trapped. To overcome such situations, the basic DERD scheme outlined above can be modified by following a dense-wetting phase solution injection step with the injection of surfactant solution followed in turn by a second dense wetting phase solution injection step. The surfactant will lower the IFT of the DNAPL, allowing it to move into and through finer grained materials, but it will also be brought to the surface by gravity forces from the dense wetting-phase solution that resides below it. Residual DNAPL left in fine-grained regions after the surfactant and second dense wetting-phase solutions are flushed from the system can be removed by flushing with a conventional surfactant or cosolvent solution. As before, various modifications of this basic scheme are possible.

The following Examples have been included to illustrate preferred modes of the invention. Certain aspects of the following Examples are described in terms of techniques and procedures found or contemplated by the present inventor to work well in the practice of the invention. These Examples are exemplified through the use of standard laboratory practices of the inventor. In light of the present disclosure and the general level of skill in the art, those of skill will appreciate that the following Examples are intended to be exemplary only and that numerous changes, modifications and alterations can be employed without departing from the spirit and scope of the invention.

EXAMPLES

The DERD method outlined above has been investigated in a set of laboratory experiments with encouraging results. Briefly, these experiments emplaced a dyed TCE solution into a heterogeneous porous media under saturated conditions in a thin, essentially two-dimensional glass cell packed with glass beads. Visual observations of the DNAPL distribution were possible at all phase s of the investigation. Following emplacement, the aqueous phase was displaced with a dense salt solution by injecting in an up-flow mode. Rapid and substantial displacement of the trapped and pooled DNAPL occurred, with a substantial amount of the DNAPL readily captured at the surface of the cell. This displacement occurred after a single pore volume of the salt solution was added and captured an estimated about 65% of the trapped DNAPL from this highly heterogeneous system. The remaining portion could have been easily removed using a combination of a surfactant followed by a dense salt solution flush to remove vertically trapped regions of high saturation, and a phase of conventional surfactant or CF.

This Example pertains to the use of a dense brine flushing solution to remove pooled DNAPLS from the subsurface. Experimental parameters including the dimensionality, media, packing geometry, and fluids were chosen to represent conditions similar to those commonly encountered in the field. The results clearly demonstrate the basic removal mechanism of the method of the present invention. Further, the results indicate that, with some minor modifications within the skill of the art, similar density—enhanced flushing strategies are feasible for many real-world DNAPL remediation scenarios.

EXPERIMENTAL SETUP

A bench-scale experimental cell was constructed to qualitatively test the density-enhanced flushing method of the present invention. The dimensions of the cell and properties of the media and chemicals used in this experiment are detailed below.

To represent field conditions involving DNAPL pools, an essentially two-dimensional flow cell was chosen rather than common but essentially one-dimensional laboratory columns. The construction and geometry of the cell are described in Table 3 and are essentially the same as that described in Thyrum (1994) and in Imhoff, Thyrum et al. (1996), as it is the same frame with some slight modifications.

TABLE 3

Details of the Experimental Flow Cell

| Parameter | Value |
| --- | --- |
| Construction: | |
| frame | aluminum with stainless steel and brass fittings |
| windows | plate glass |
| gasket | neoprene rubber |
| screens | stainless steel |
| Internal dimensions: | |
| sand width | 20.0 ± 0.2 cm |
| sand height | 15.0 ± 0.2 cm |
| sand thickness | 2.0 ± 0.5 mm |
| reservoirs | 0.5 × 0.5 × 7.75 in |
| Porous media: | |
| coarse | Quackenbush Company, "Q-bead", 0.8-mm glass beads |
| fine | Cataphote MILG-9954A size 4, $ > 0.25$-mm glass beads |
| very fine | Cataphote MIL-G-9954A size 10, $0.125 < d_{50} < 0.150$ mm glass beads |

The cell was packed with three different kinds of glass beads. The first was a very fine glass bead (size 10) that was used only along the sides of the cell within one-half inch of the gasket. It was placed there to keep free-phase DNAPL fi-om contacting and destroying (dissolving) the gasket material. The fine (size 4) glass beads were used to form the bulk of the domain and they correspond to a relatively fine sand.

The third glass bead (nominally 0.8-mm diameter) was used to create the coarse inclusion. The average size of these beads corresponds to a coarse sand. It was used as it has an appreciably lower entry pressure than the finer beads and, when used with them, could be expected to readily form stable TCE pools on the order of 15-cm in height. This is clearly sufficient for the size of the domain chosen.

At the top and bottom of the sand domain, a stainless steel screen was used in conjunction with stainless steel wool. The screen acted as a porous barrier that would allow fluids to easily pass through while retaining even the finest of the glass beads. The stainless steel wool was used as a porous support for the relatively flimsy screen material. A stainless steel needle was inserted through the top screen as a means of injecting DNAPL into the domain.

The DNAPL and the flushing solutions that were used are described in Table 4. All water used in the experiment was de-ionized and then de-aired (DDI) using a vacuum pump. The trichloroethylene (TCE) used as a DNAPL was an analytical grade reagent and was subsequently dyed with less than 0.01% by weight Oil-Red-O (ORO) to give it a red color and makes it much more visible in FIGS. 1 and 2 attached hereto. The ORO dye has little or no effect on the physical properties of the TCE and will not partition into the aqueous phase.

TABLE 4

Fluid Properties

| Fluid | ρ @ 20° C. (g/cc) | μ @ 20° C. (cp) |
| --- | --- | --- |
| trichloroethylene (TCE) | 1.4642 | 0.57 |
| DDI water | 1.0 | 1.0 |
| NaI solution (58% by weight NaI) | 1.7518 | 2.095 |
| NaI/Aerosol AY-OT mixture | 1.6675 | ND |

EXPERIMENTAL PTOCEDURE

Figure 1:
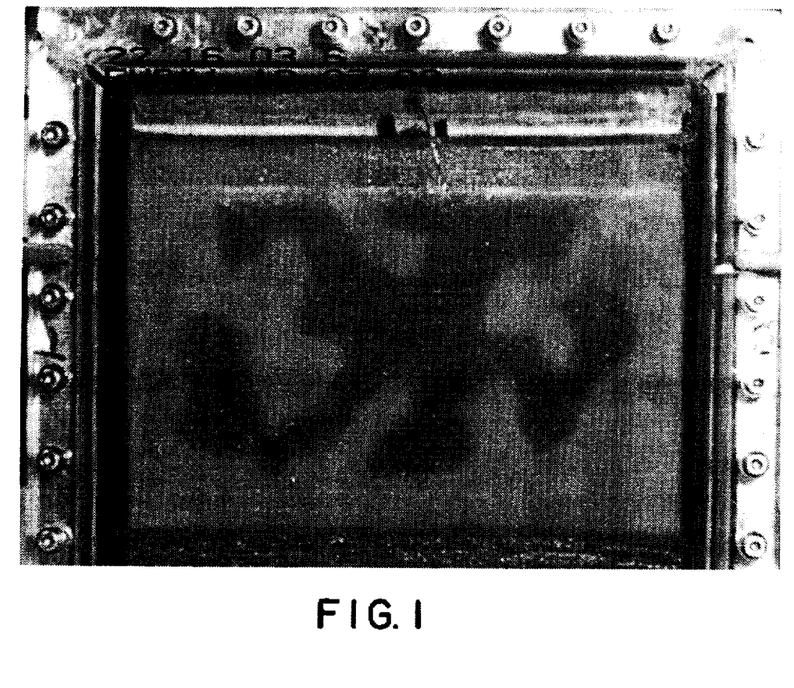
FIG. 1 is a color photograph of a glass cell packed with glass beads and showing simulated subsurface contamination by a DNAPL.
Figure 2:
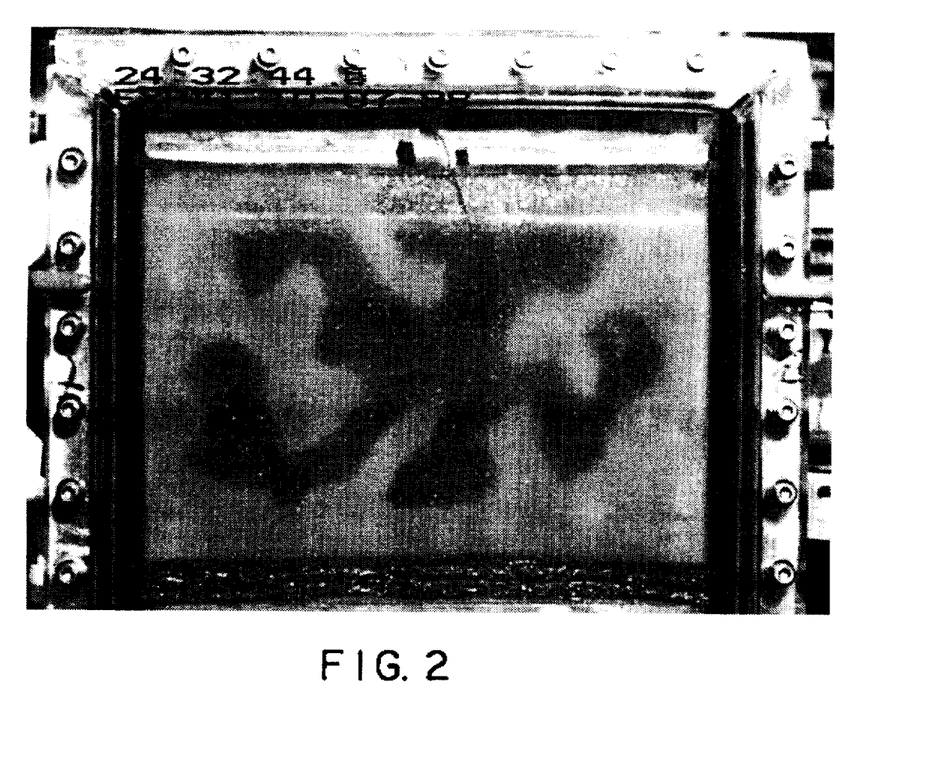
FIG. 2 is a color photograph of the cell depicted in FIG. 1 after introduction of a dense aqueous solution in accordance with the methods of the present invention.

The following is a description of the sequence of events. Time-lines that correspond to still photographs that were taken during the experiment, as presented in FIGS. 1 and 2, are provided in Tables 5 and 6. The times recorded in FIGS. 1 and 2 and in Tables 5 and 6 are "wall-times" in hr:min:sec relative to the time at which DNAPL was first injected into the domain.

After creating the packing, air in the cell was displaced with carbon dioxide. The cell was then flushed with DDI water in an up-flow fashion to displace and/or dissolve all of the carbon dioxide gas within the cell. This procedure resulted in a domain completely saturated with DDI water. The cell was then flushed with more than ten pore volumes of DDI water to clean (rinse) it and ensure that all gas bubbles were gone.

A syringe was used to slowly inject the DNAPL (TCE with ORO) into the domain. When a pool of desired dimensions had formed, the TCE injection ceased. The TCE was allowed to reach a static fluid configuration by letting it sit overnight.

The next morning, the NaI solution was pumped into the domain in an up-flow configuration. Since the NaI solution was much more dense than water (see Table 4), it was a stable displacement scenario and the experiment clearly demonstrated a sharp and level front between the DDI water and the advancing flushing front. At the front, a significant fraction of the total TCE mass collected and floated out of the sand domain. This is clearly shown in the still images presented in FIGS. 1 and 2.

When the flush was finished, the TCE removed from the sand was extracted from the upper reservoir of the flow cell using a second syringe. The cell was once again flushed—this time with a down-flow current of DDI water. The DDI water was used to remove the NaI solution from the sand and to see what would happen to the TCE that remained. The TCE left within the domain (especially in the lower left-hand corner, where the most TCE remained) did shift downwards sightly during the DDI water flush which indicated that a small TCE pool was still present.

TABLE 5

Sequence of Events - Simulation of Contamination

| Date/Time | | Description |
| --- | --- | --- |
| Day 1–Day 3 | | The "Thyrum" cell was packed with glass beads. The pattern was chosen as it was a "clearly heterogeneous" packing. The rear glass plate cracked after packing (during final tightening of the bolts-gasket compression). To keep the cell from leaking, the cracked rear glass plate was covered by an acrylic (Plexiglass (tm)) insert and a seal was made using Vaspar (a putty-like wax). The cracks are evident during the experiments but they are sufficiently tight that the DNAPL is not able to enter or pass through them. The cell was flushed with $CO_2$ gas and then many pore volumes (>10) of DDI $H_2O$ to dissolve away all gas bubbles and wash the cell and glass beads. |
| Day 5 | | DNAPL was injected. Initially, the cell is saturated with DDI $H_2O$ and the DNAPL is injected, using a syringe, through the SS needle at the top of the domain. |
| Day 5 | 00:00:00 | DNAPL (TCE with ORO) injection starts. |
| | 00:00:11 | ±2.5 mL cumulative DNAPL injected. |
| | 00:00:14 | ±3.5 mL cumulative DNAPL injected. |
| | 00:00:15.5 | ±4.35 mL cumulative DNAPL injected. |
| | 00:00:17 | ±5.6 mL cumulative DNAPL injected. |
| | 00:00:19 | ±6.45 mL cumulative DNAPL injected. |
| | 00:00:21 | ±7.35 mL cumulative DNAPL injected. |
| | 00:00:22 | DNAPL injection complete: ±7.35 mL total. The DNAPL clearly formed a single pool of high (>50%) saturation with some residual DNAPL trapped near the point of injection. |

TABLE 6

Sequence of Events - Remediation of Contamination

| Date/Time | | Description |
| --- | --- | --- |
| Day 6 | | DNAPL is allowed to reach static conditions overnight. Cell leaked slightly more than 10 mL of water over night. However, no air entered the domain due to the constant-head water reservoirs connected at both ends. |
| Day 7 | 22:15 | Brine solution is injected into the domain from the bottom using a constant-head marriot. Brine solution first fills the lower reservoir (8.0 by 0.5 by 0.5 in) and the difference in densities is clearly visible due to diffraction. |
| | 22:22 | Brine begins to enter the glass beads from the bottom and is visible as it darkens the domain-NaI solution is clear yellow in color. |
| | 22:24 | Brine front has moved half-way through the domain. |
| | 22:26 | Brine reaching top of top of glass beads and TCE flotation is clearly evident. |
| | 22:27 | All the DNAPL that is removed by flotation is, at this point, removed from the glass beads. |
| | 22:28–22:34 | NaI solution fills the upper reservoir (8.0 by 0.5 by 0.5 in). |
| | 22:50–23:54 | DNAPL is removed from the domain using a syringe. Unfortunately, a mass balance was not possible due to evaporative and other losses during the DNAPL extraction procedure. |
| | 23:56 | Start of reverse flush of DDI water to remove brine solution. |
| | 24:02 | Roughly half of the brine solution has been flushed from the domain. |
| | 24:15 | Essentially all of the brine solution has been flushed away. FIG. 2 shows DNAPL entrapment caused by the geometry of the packing. |

From observation and image analysis of the bench-scale flow experiment performed during the period described in Tables 5 and 6 above, the following results are noted.

(1) Density-enhanced approaches can remove a significant fraction of the DNAPL present in pools. Image analysis showed that roughly 65% of the TCE was removed in this experiment.

(2) Density-enhanced approaches can accomplish rapid removal—only one pore volume of flushing solution is required.

(3) While capillary trapping may limit the effectiveness of this method, the addition of a surfactant could drastically reduce trapping and result in a much higher percent removal.

DNIAPL contamination of subsurface systems is an important problem that remains largely unsolved. Existing methods to remediate subsurface systems suffer from a variety of limitations, which in most cases are amplified by heterogenous conditions that exist in virtually all natural systems. A new method, density-enhanced remediation of DNAPLs (DERD), is introduced as an alternative to existing technologies. A standard approach and some typical modifications to the DERD approach are outlined in sufficient detail to allow the implementation of the method at the field scale by one skilled in the art. DERD is an effective and economical method for restoration of DNAPL-contaminated subsurface systems, and some of the relative advantages over prior art alternative techniques are set forth in Table 7 below.

TABLE 7

Overview of Cleanup Strategies - Srengths and Weaknesses

PAT
(1) not likely to promote downward migration of DNAPLs
(2) high operating and maintenance costs
(3) very slow-essentially perpetual treatment required CF
(1) potentially rapid cleanup of some sites
(2) may cause further contamination by downward migration
(3) expensive flushing solution
(4) potentially toxic flushing solution SF
(1) potentially rapid cleanup of some sites
(2) may cause further contamination by downward migration SI
(1) potentially rapid cleanup of some sites
(2) unsuited to some (especially deep) spill scenarios
(3) expensive process (large energy input)

RW
(1) low operating and maintenance costs
(2) unsuited to some (especially deep) spill scenarios
(3) very slow-essentially perpetual treatment required DERD
(1) potential for rapid-cleanup of all sites
(2) not likely to promote downward migration of DNAPLs
(3) works in presence of DNAPL pools
(4) fast cleanup times
(5) non-toxic flushing solution

REFERENCES

Bartow, G. and Davenport, C. (1996), *Ground Water Monitoring and Remediation*, 15(2):140–146.

Brandes, D. (1992), *Effect of Phase Behavior on Residual Dense Nonaqueous Phase Liquid Displacement from Porous Media by Alcohol Flooding*, Ph.D. Thesis, Clemson University, Clemson, South Carolina Brandes and Farley (1993), *Journal of Water Environment Research*, 65(7):869–878.

de Marsily, G. (1986), *Quantitative Hydrogeology: Groundwater Hydrology for Engineers*, Academic Press, San Diego, Calif.

Domenico, P. A. and Schwartz, F. W. (1990), *Physical and Chemical Hydrogeology*, John Wiley and Sons, New York.

Dupont, R. R. (1993), *Environmental Progress*, 12(1):45–53.

Forsyth, P. A. (1994), *International Journal for Numerical Methods in Fluids*, 19(12):1055–1081.

Imhoff, Gleyzer et al. (1995), *Environmental Science & Technology*, 29(8): 1966–1976.

Imhoff, Thyrum et al. (1996), *Water Resources Research*, 32(7):1929–1942.

Kaplan, Cantrell et al. (1996), *Journal of Environmental Quality*, 25(5):1086–1094.

Larkin and Hemingway (1991), *Chemicals in Ground Water: Prevention, Detection, and Restoration*, 191–204.

Larson, Davis et al. (1982), *Journal of Petroleum Technology*, 243–258.

Lipe, Sabatini et al. (1996), *Ground Water Monitoring and Remediation*, 16(1):85–92.

Longino and Kueper (1995), *Canadian Geotechnical Journal*, 32:296–308.

Mackay and Cherry (1989), *Environmental Science & Technology*, 2 (6):630–636.

Marley, M. C. (1991), *Proceedings of the Fifth National Outdoor Action Conference on Aquifer Restoration, Ground Water Monitoring, and Geophysical Methods*, 89–102.

Mason and Kueper (1996), *Environmental Science & Technology*, 30(11):3205–3215.

Mayer and Miller (1996), *Water Resources Research*, 32(6):1551–1567.

Mccann, Boersma, et al. (1994), *Environmental Progress*, 13(3):208–213.

Mercer and Cohen (1990), *Journal of Contaminant Hydrology*, 6(2):107–163.

Michalski, Metlitz et al. (1995), *Ground Water Monitoring and Remediation*, 15(1):90–100.

Miller, Poirier-McNeill et al. (1990), *Water Resources Research*, 26(11):2783–2796.

Okuda, Mcbride et al. (1996), *Environmental Science & Technology*, 30(6):1852–1860.

Pearce, Voudrias et al. (1994), *Journal of Environmental Engineering-ASCE*, 120(5):1191–1206.

Pennell, Abriola et al. (1996), *The use of surfactants to remediate NAPL-contaminated aquifers*, L. N. Reddi, editor, *Non-Aqueous Phase Liquids (NAPLs) in the Subsurface Environment: Assessment and Remediation*, Proceedings of the Specialty Conference Held in Conjunction with the ASCE National Convention, 221–232, New York, American Society of Civil Engineers.

Pennell, Pope et al. (1996), *Environmental Science & Technology*, 30:1328–1335.

Pope and Wade (1995), *Lessons from Enhanced Oil Recovery Research for Surfactant-enhanced Aquifer Remediation*, Sabatini, Knox et al., eds., *Surfactant-Enhanced Subsurface Remediation: Emerging Technologies*, 142–160. American Chemical Society, Washington, DC.

Rao, Annable et al. (1997), *Water Resources Research*, 33(12)2673–2686.

Roeder, Brame et al. (1996) *Non-Aqueous Phase Liquids (NAPLs in Subsurface Environment: Assessment and Remediation)*, L. N. Reddi, ed., 333–344, New York.

Ross and Lu (1994), *Water Resources Research*, 30(2):581–584.

Schwille, F. (1988), *Dense Chlorinated Solvents in Porous and Fractured Media*.

Semprini, Roberts, et al. (1990), *Ground Water*, 28(5):715–727.

Sharma and Shah (1989), *Use of Surfactants in Oil Recovery*, Donaldson, Chilingarian, eds., *Enhanced Oil Recovery II: Processes and Operations*, 255–315, Elsevier, Amsterdam.

She, Sleep et al. (1995), *Journal of Soil Contamination*, 4(3)227–242.

Shiau, Sabatini et al. (1996), *Environmental Science & Technology*, 30:97–103.

Sittler, Swinford, et al. (1992), *Proceedings of the 1992 Petroleum Hydrocarbons and Organic Chemicals in Ground Water: Prevention, Detection, and Restoration*, 413–426. The American Petroleum Institute and The Association of Ground Water Scientists and Engineers (a division of NGWA).

Thyrum, G. P. (1994), *An Investigation of Residual Nonaqueous Phase Liquid Dissolution in Water Saturated Porous Media*. Master of Science Thesis, University of North Carolina, Chapel Hill, North Carolina.

Travis and Macinnis (1992), *Environmental Science & Technology*, 26(10):1885–1887.

Tsien, Brusseau et al. (1989), *Applied and Environmental Microbiology*, 55(12):3155–3161.

U.S. Army Corps of Engineers (1995), *Soil vapor extraction and bioventing, Engineering and Design EM* 1110-1-4001, U.S. Army Corps of Engineers, Washington, DC.

U.S. Pat. No. 5,753,122

U.S. Pat. No. 5,449,251.

Vancho, L. A. (1994), *The cosolvent effect of methanol on the equilibrium between tetrachloroethylene and water*, Master's thesis, University of North Carolina at Chapel Hill, Chapel Hill, North Carolina.

Walter, G. R. (1994), *Ground Water*, 32(1):146–148.

Whelan, Voudrias et al. (1994), *Journal of Contaminant Hydrology*, 15(3):223–237.

Willson, Hall et al. (1998), *Factors affecting bank formation during suffactant-enhanced mobilization of residual NAPL*, in review.

Windholz, M. (1983), Merck Index, Merck & Co., Rahway, New Jersey.

Zacharias, Lang et al. (1995), *Water Research*, 29(7):1663–1671.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for remedying contamination of a subsurface environment by a non-aqueous phase liquid that is denser than water (DNAPL), the subsurface environment having a resident aqueous phase and a DNAPL phase, the method comprising the steps of:

(a) introducing a dense aqueous solution that has a density greater than a density of the DNAPL phase to the subsurface environment;

(b) displacing the resident aqueous phase with the dense aqueous solution, thereby causing the DNAPL phase to rise above the greater density aqueous solution; and (c) recovering the DNAPL phase and thereby substantially remedying contamination of the subsurface environment.

2. The method of claim 1, wherein the DNAPL is selected from the group consisting of carbon tetrachloride, o-dichlorobenzene, m-dichlorobenzene, 1,1-dichloroethane, 1,2-dichloroethane, 1,1,1-trichloroethane (1,1,1-TCA), 1,1,2-trichloroethane (1,1,2-TCA), 1,1-dichloroethylene, trichloroethylene (TCE), tetrachloroethylene (PCE) and combinations thereof.

3. The method of claim 1, wherein the dense aqueous solution is selected from the group consisting of a salt solution, a sugar solution or combinations thereof.

4. The method of claim 3, wherein the dense aqueous solution comprises a component selected from the group consisting of ammonium iodide, ammonium nitrate, barium iodide, barium bromide, barium chlorate, barium chloride, barium perchlorate, calcium bromide, calcium chloride, calcium iodide lithium bromate, magnesium bromide, magnesium iodide, potassium chloride, potassium citrate, potassium iodide, potassium formate, sodium bisulfate, sodium bromide, sodium chlorate, sodium chloride, sodium hydroxide, sodium iodide, sodium perchlorate, sodium tungstate, sucrose, and combinations thereof.

5. The method of claim 1, wherein the resident aqueous phase and the DNAPL phase define a first volume in the subsurface environment, and wherein the dense aqueous solution is introduced in a volume substantially equivalent to the first volume defined by the resident aqueous phase and the DNAPL phase in the subsurface environment.

6. The method of claim 1, further comprising:

(a) performing steps (a) and (b) of claim 1;

(b) introducing a surfactant to the subsurface environment after step (b) of claim 1;

(c) introducing a second volume of a dense aqueous solution that has a density greater than a density of the DNAPL phase to the subsurface environment, thereby causing the DNAPL to rise above the greater density aqueous solution; and (d) recovering the DNAPLs and thereby substantially remedying contamination of the subsurface environment.

7. The method of claim 1, further comprising removing the dense aqueous solution from the subsurface environment.

8. The method of claim 1, further comprising removing any remaining residual DNAPL.

9. The method of claim 8, wherein the removing method comprises flushing a surfactant or cosolvent solution through the subsurface environment.

10. A method for remedying contamination of a subsurface environment by a non-aqueous phase liquid that is denser than water (DNAPL), the subsurface environment having a resident aqueous phase and a DNAPL phase, the method comprising the steps of:

(a) introducing a surfactant to the subsurface environment;

(b) introducing a dense aqueous solution that has a density greater than a density of the DNAPL phase to the subsurface environment;

(c) displacing the resident aqueous phase with the dense aqueous solution, thereby causing the DNAPL phase to rise above the greater density aqueous solution; and (d) recovering the DNAPL phase and thereby substantially remedying contamination of the subsurface environment.

11. A method for remedying contamination of a subsurface environment by a non-aqueous phase liquid that is denser than water (DNAPL), the subsurface environment having a resident aqueous phase and a DNAPL phase, the method comprising the steps of:

(a) introducing a volume of a dense aqueous solution that has a density greater than a density of the DNAPL phase to the subsurface environment, the volume of the dense aqueous phase comprising a volume substantially equivalent to the volume of the subsurface environment;

(b) displacing the resident aqueous phase with the dense aqueous solution, thereby causing the DNAPL to rise above the greater density aqueous solution; and (c) recovering the DNAPL and thereby substantially remedying contamination of the subsurface environment.

12. The method of claim 11, wherein the DNAPL is selected from the group consisting of carbon tetrachloride, o-dichlorobenzene, m-dichlorobenzene, 1,1-dichloroethane, 1,2-dichloroethane, 1,1,1-trichloroethane (1,1,1-TCA), 1,1,2-trichloroethane (1,1,2-TCA), 1,1-dichloroethylene, trichloroethylene (TCE), tetrachloroethylene (PCE) and combinations thereof.

13. The method of claim 11, wherein the dense aqueous solution is selected from the group consisting of a salt solution, a sugar solution or combinations thereof.

14. The method of claim 13, wherein the dense aqueous solution comprises a component selected from the group consisting of ammonium iodide, ammonium nitrate, barium iodide, barium bromide, barium chlorate, barium chloride, barium perchlorate, calcium bromide, calcium chloride, calcium iodide lithium bromate, magnesium bromide, magnesium iodide, potassium chloride, potassium citrate, potassium iodide, potassium formate, sodium bisulfate, sodium bromide, sodium chlorate, sodium chloride, sodium hydroxide, sodium iodide, sodium perchlorate, sodium tungstate, sucrose, and combinations thereof.

15. The method of claim 11, further comprising:
(a) performing steps (a) and (b) of claim 11;
(b) introducing a surfactant to the subsurface environment after step (b) of claim 11;
(c) introducing a second volume of a dense aqueous solution that has a density greater than a density of the DNAPL phase to the subsurface environment, thereby causing the DNAPL to rise above the greater density aqueous solution; and
(d) recovering the DNAPL and thereby substantially remedying contamination of the subsurface environment.

16. The method of claim 11, further comprising removing the dense aqueous solution from the subsurface environment.

17. The method of claim 11, further comprising removing any remaining residual DNAPL.

18. The method of claim 17, wherein the removing method comprises flushing a surfactant or cosolvent solution through the subsurface environment.

19. A method for remedying contamination of a subsurface environment by a non-aqueous phase liquid that is denser than water (DNAPL), the method comprising the steps of:
(a) locating a region having a subsurface environment with DNAPL contamination, the subsurface environment having a resident aqueous phase and a DNAPL phase;
(b) bounding the region with a plurality of bounding wells for injecting a dense aqueous solution into the subsurface environment;
(c) installing a pumping well in a center of the region which penetrates a portion of the resident aqueous phase;
(d) initiating pumping with the pumping well at a rate sufficient to induce a gradient that captures flow from the region;
(e) establishing a path for the flow from the region through a treatment station;
(f) injecting a dense aqueous solution having a density greater than a density of the DNAPL phase via the bounding wells at a depth that bounds a vertical extent of the DNAPL phase, thereby displacing the resident aqueous phase with the injected dense aqueous solution and causing the DNAPL phase to rise as a free-phase above the greater density aqueous solution;

(g) collecting the free-phase DNAPL in the treatment station via the pumping well; and
(h) maintaining the pumping of step (d) and injecting of step (f) until free-phase DNAPL is no longer collected from the pumping well, thereby substantially remedying contamination of the subsurface environment.

20. The method of claim 19, wherein the DNAPL is selected from the group consisting of carbon tetrachloride, o-dichlorobenzene, m-dichlorobenzene, 1,1-dichloroethane, 1,2-dichloroethane, 1,1,1-trichloroethane (1,1,1-TCA), 1,1,2-trichloroethane (1,1,2-TCA), 1,1-dichloroethylene, trichloroethylene (TCE), tetrachloroethylene (PCE) and combinations thereof.

21. The method of claim 19, wherein the dense aqueous solution is selected from the group consisting of a salt solution, a sugar solution or combinations thereof.

22. The method of claim 21, wherein the dense aqueous solution comprises a component selected from the group consisting of ammonium iodide, ammonium nitrate, barium iodide, barium bromide, barium chlorate, barium chloride, barium perchlorate, calcium bromide, calcium chloride, calcium iodide lithium bromate, magnesium bromide, magnesium iodide, potassium chloride, potassium citrate, potassium iodide, potassium formate, sodium bisulfate, sodium bromide, sodium chlorate, sodium chloride, sodium hydroxide, sodium iodide, sodium perchlorate, sodium tungstate, sucrose, and combinations thereof.

23. The method of claim 19, wherein the resident aqueous phase and the DNAPL phase define a first volume in the subsurface environment, and wherein the dense aqueous solution is injected in a volume substantially equivalent to the first volume defined by the resident aqueous phase and the DNAPL phase in the subsurface environment.

24. The method of claim 19, further comprising:
(a) performing steps (a)–(f) of claim 19;
(b) injecting a surfactant to the subsurface environment after step (f) of claim 19;
(c) injecting a second volume of a dense aqueous solution that has a density greater than a density of the DNAPL phase to the subsurface environment, thereby causing the DNAPL phase to rise as a free-phase above the greater density aqueous solution; and
(d) collecting the free-phase DNAPL in the treatment station via the pumping well.

25. The method of claim 19, further comprising discontinuing the injecting of the dense aqueous solution while maintaining pumping to capture the residual injected solution and remove it from the subsurface environment.

26. The method of claim 19, further comprising removing any remaining residual DNAPL.

27. The method of claim 26, wherein the removing method comprises flushing a surfactant or cosolvent solution through the bounding wells.

* * * * *